(No Model.)
A. B. SHAW.
PNEUMATIC TIRE.
No. 593,544. Patented Nov. 9, 1897.
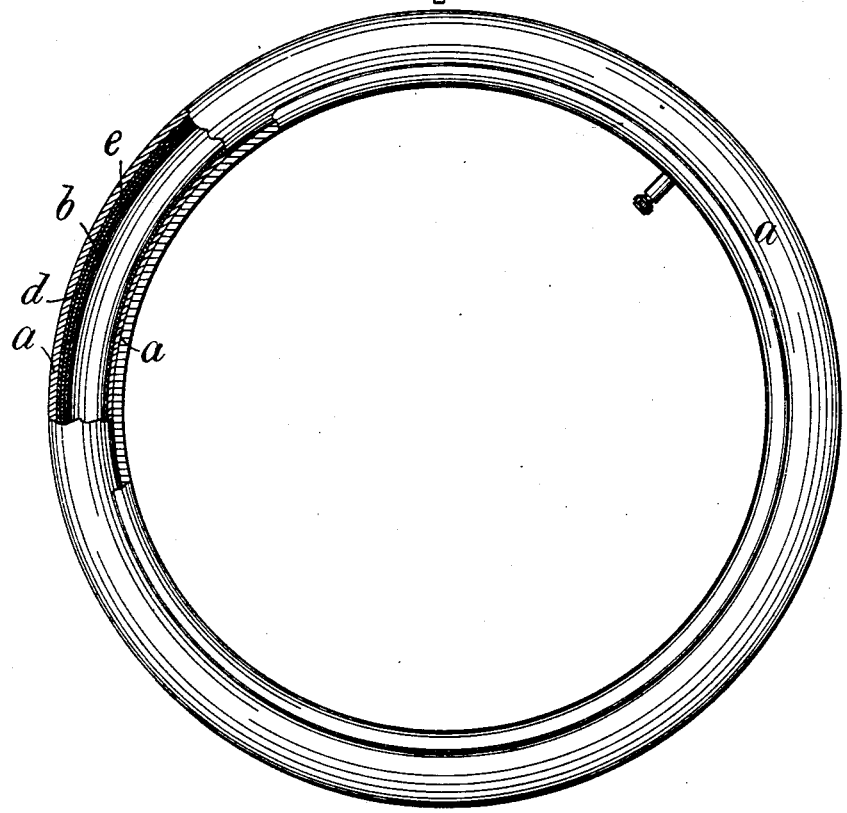
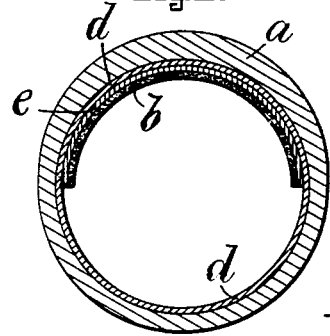 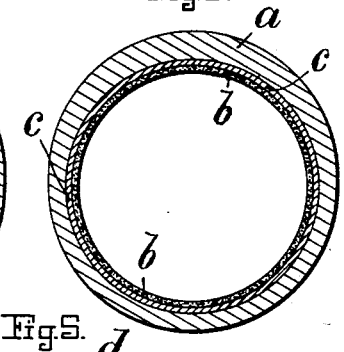 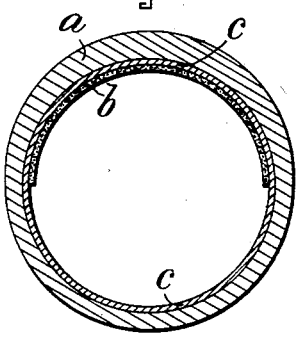
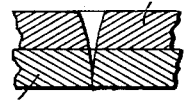 
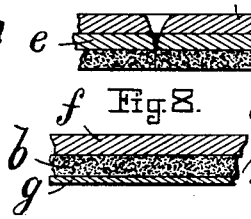 
Witnesses
D. E. Kempster
S. Bayard Thompson
Inventor
A. B. Shaw
by Henry Chadbourn
his atty.

UNITED STATES PATENT OFFICE.

AI B. SHAW, OF MEDFORD, MASSACHUSETTS, ASSIGNOR TO THE SELF-SEALING BICYCLE TIRE COMPANY, OF PORTLAND, MAINE.

PNEUMATIC TIRE.

SPECIFICATION forming part of Letters Patent No. 593,544, dated November 9, 1897.

Application filed June 4, 1897. Serial No. 639,385. (No model.)

*To all whom it may concern:*

Be it known that I, AI B. SHAW, of Medford, in the county of Middlesex and State of Massachusetts, have invented certain new and useful Improvements in Pneumatic Tires, of which the following, taken in connection with the accompanying drawings, is a specification.

This invention relates to improvements in pneumatic tires, and more especially to improvements in the construction of the inner air-tube, whereby when the tire is punctured it may be automatically sealed or closed and the escape of air thereby prevented.

The objects of my invention are to effectively produce the desired result with as little increase of the weight of the tire or in the expense of construction as is possible, and without lessening its resiliency to so incorporate a sealing material for the purpose of thus preventing the escape of air when the tire is punctured that said material may be maintained in a sticky state and in a permanently active condition, and to otherwise improve the tire, as will be fully understood by a further description of the invention.

The invention consists, first, in the employment of a layer of absorbent material, preferably fibrous and permanently attached to the inner surface of the air-tube, said layer being saturated with any suitable sticky sealing compound, and, second, in the combination, with a layer of such saturated absorbent material, of a layer of upset rubber.

The invention is carried out substantially as illustrated in the accompanying drawings, wherein—

Figure 1 represents a side elevation, partly in section, of the felly and pneumatic tire of a wheel containing my invention. Fig. 2 represents a cross-section of a pneumatic tire, showing one arrangement of my improvement. Fig. 3 represents a similar cross-section of a pneumatic tire, showing another arrangement of my invention. Fig. 4 represents a similar cross-section of a pneumatic tire, showing still another arrangement of my invention. Figs. 5 and 6 represent, respectively, a sectional and a plan view of a small portion of the inner air-tube when made of a layer of stretched rubber and a layer of upset rubber, showing the action of such a tire when punctured. Fig. 7 represents a sectional view of a small portion of the inner air-tube when made of a layer of stretched rubber, a layer of upset rubber, and an attached layer of absorbent material saturated with a sticky sealing material, showing the action of such a tube when punctured. Fig. 8 represents a section of a small piece of the inner air-tube containing my improvements, but arranged in a different manner from those shown in the other views.

Like characters of reference refer to like parts wherever they occur on different parts of the drawings.

The outer casing $a$ of the tire is made in any of the usual and well-known manners and may be varied, as desired. Within this casing is placed the air-tube, which may be made separate from the casing, or it may be vulcanized to the casing in the usual manner and as desired.

The object of my present invention, as above set forth, is to improve the inner air-tube, and my improvement consists in the introduction of a layer $b$, of absorbent material, preferably fibrous—such as wool, felt, cotton-flannel, cotton-batting, leather, or other absorbent fibrous material—said layer being saturated with any suitable sticky sealing preparation, which is preferably in a semiliquid state and which will be given up readily when required to seal a puncture and will remain normally in a permanently sticky and active condition. This layer $b$ may be sufficiently large to cover the entire inner surface of the air-tube, as shown in Fig. 3, or it may be only large enough to cover the tread portion of the tire, as shown in Figs. 2 and 4, or any other portion of the inner tube, as desired.

The inner air-tube on which my improvements are used may be made from a single layer $c$, of rubber or other air-tight material, as shown in Figs. 3 and 4, or it may be made from two layers $d$ $e$, as shown in Figs. 1 and 2, the layer $d$ being of stretched rubber and the layer $e$ being of upset rubber, secured to the inside of the layer $d$ and covering more or less of the surface of the layer $d$. If so desired, the inner tube may be made from two layers $f$ and $g$, and the layer $d$ of absorbent material be inserted between the two layers, as shown in Fig. 8, the layer $f$ being made from one or more layers of rubber or other suitable air-tight material and the layer $g$ being made very thin, of rubber, paper, or other material, to cover the absorbent layer and prevent the sticky sealing material from sticking the opposite sides of the inner tube together when the tube is deflated or collapsed. I prefer to use my invention in connection with an inner tube made from two layers, such as $d$ and $e$, of stretched rubber and upset rubber, as the best results are thereby obtained.

The operation of my improved pneumatic tire is substantially as follows: If a puncturing instrument enters the tire, penetrates the inner air-tube, and enters the absorbent layer with its contained sealing preparation, the puncturing instrument will be coated with a portion of the sealing preparation, which will adhere thereto and be carried thereby into the puncture when the instrument is withdrawn. This will stick the walls of the puncture together, and at the same time the pressure of the air within the inner tube will cause the sealing preparation to be forced together, closing the puncture in the absorbent layer, forming a bridge across the puncture in the tube, so as to close the same airtight automatically. If the puncture is so large that the quantity of sealing preparation withdrawn by the puncturing instrument and forced into the puncture by the air-pressure within the air-tube is insufficient to automatically close the puncture, it will be readily and quickly closed by deflating the tube and applying pressure on the outer surface of the tire around said puncture. This will force the extra quantity of the sealing preparation required from the absorbent layer into the opening made by the puncturing instrument and close it permanently.

When an inner air-tube of a pneumatic tire is made of a layer of stretched rubber, as $d$, and a layer of upset rubber, as $e$, the layer $d$ must be stretched to such an extent as to exert sufficient force to retain the layer $e$ in an upset condition, and when such a tire is punctured it has been found that the tendency of the layer $d$ is to draw backward and to open the puncture on the outside of the tube, while the tendency of the layer $e$ is to press the walls of the puncture together on the inside of the tube and thus close the puncture; but the drawing backward of the layer $d$ has been found to overcome the tendency of the layer $e$ to force the walls of the puncture together at the junction of the two layers and for a short distance into the layer $e$. This causes the puncture to act in a manner substantially as illustrated in Figs. 5 and 6. If the layer of upset rubber is not sufficiently thick, this action of the two layers when punctured will allow a gradual escape of air and deflate the tire. Hence it has become a necessity to increase the thickness of the upset rubber, and consequently to materially increase the weight and expense of the tire and to lessen its resiliency; but even when the upset rubber is increased in thickness there are cases in which air will gradually work through the puncture and deflate or partially deflate the tire. When such a construction of the inner tube is used in connection with my invention, I am able to materially reduce the thicknesses and the weights of the layers $d$ and $e$, as the absorbent fibrous layer $b$ will act not only to hold the walls of the puncture together, but will also give up sealing preparation and cause the puncture to be filled and bridged over by said sealing material, so as to prevent the escape of air.

The action of an air-tube made from stretched and upset rubber and supplied with a layer of saturated absorbent material when punctured has been clearly illustrated in Fig. 7.

Having thus fully described the nature, construction, and operation of my invention, I wish to secure by Letters Patent and claim—

1. In a pneumatic tire, an inner air-tube comprising a layer of absorbent material, saturated with an absorbable sticky preparation to seal any punctures made therein for the purpose set forth.

2. In a pneumatic tire, an inner air-tube having a layer of absorbent material saturated with a puncture-sealing preparation to seal any punctures made therein for the purpose set forth.

3. In a pneumatic tire, an inner air-tube having a layer of absorbent material permanently attached to said tube and saturated with a puncture-sealing preparation, to seal any punctures made therein for the purpose set forth.

4. In a pneumatic tire, an inner air-tube having a layer of absorbent fibrous material saturated with a puncture-sealing preparation, to seal any punctures made therein for the purpose set forth.

5. In a pneumatic tire, an inner air-tube composed of a layer of stretched rubber, a layer of upset rubber, and a layer of absorbent material saturated with a puncture-sealing preparation, for the purpose set forth.

6. A pneumatic tire, having a permanently-attached inner air-tube, and a layer of absorbent material saturated with a sticky sealing preparation, to seal any punctures made therein for the purpose set forth.

7. In combination with a pneumatic tire a layer of absorbent material permanently attached to the inner wall thereof, said absorbent layer saturated with a puncture-closing preparation to seal any punctures made therein for the purpose set forth.

In testimony whereof I have signed my name to this specification, in the presence of two subscribing witnesses, on this 3d day of June, A. D. 1897.

AI B. SHAW.

Witnesses:
HENRY CHADBOURN,
S. BAYARD THOMPSON.